Figure 1:
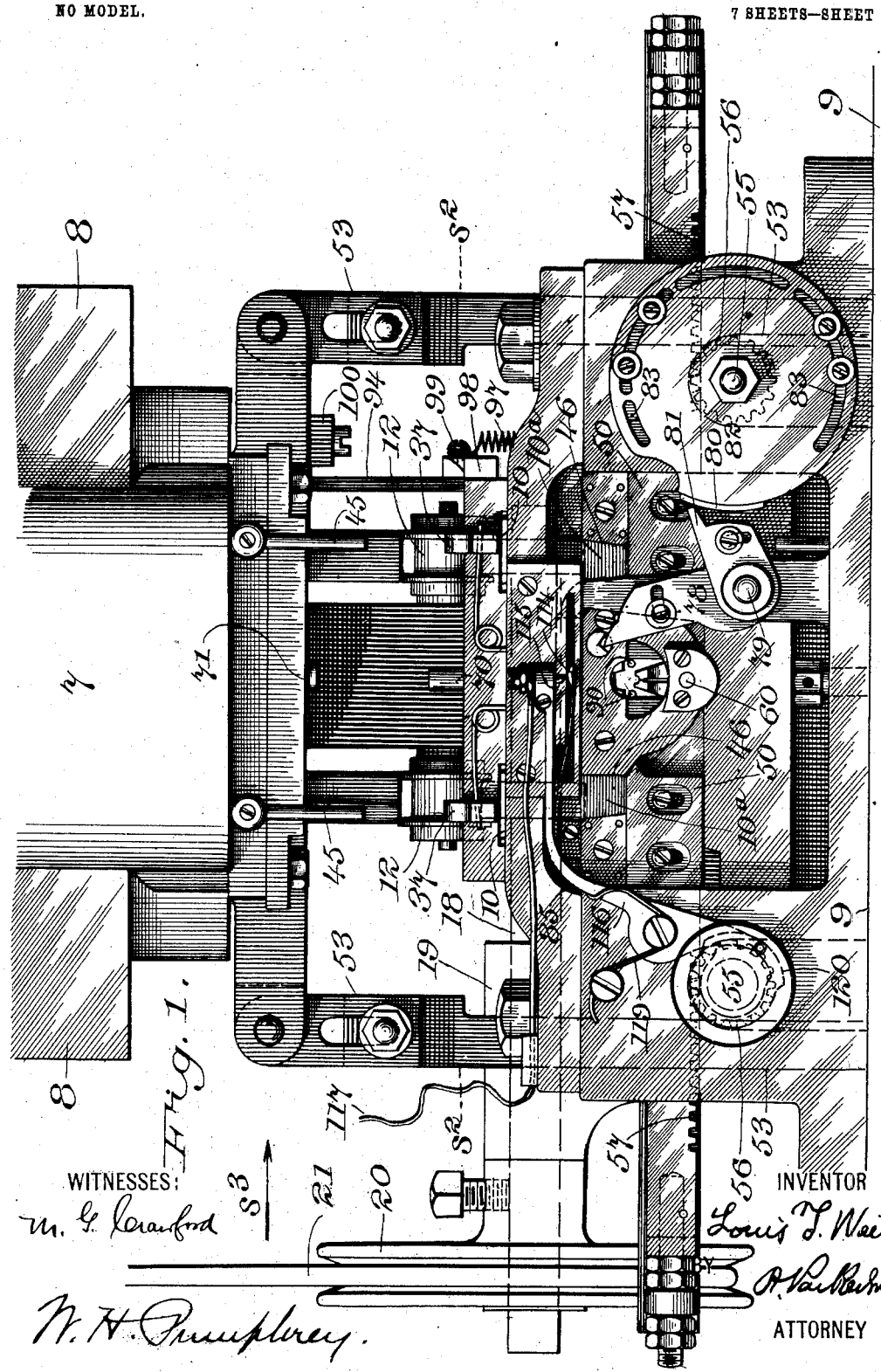

No. 738,266. PATENTED SEPT. 8, 1903.
L. T. WEISS.
HINGE MAKING MACHINE.
APPLICATION FILED AUG. 2, 1902.
NO MODEL. 7 SHEETS—SHEET 1.

WITNESSES:
M. G. Crawford
W. H. Humphrey.

INVENTOR
Louis T. Weiss
BY
ATTORNEY

No. 738,266. PATENTED SEPT. 8, 1903.
L. T. WEISS.
HINGE MAKING MACHINE.
APPLICATION FILED AUG. 2, 1902.
NO MODEL. 7 SHEETS—SHEET 2.

WITNESSES:
INVENTOR
Louis T. Weiss
BY
ATTORNEY

No. 738,266. PATENTED SEPT. 8, 1903.
L. T. WEISS.
HINGE MAKING MACHINE.
APPLICATION FILED AUG. 2, 1902.
NO MODEL. 7 SHEETS—SHEET 3.
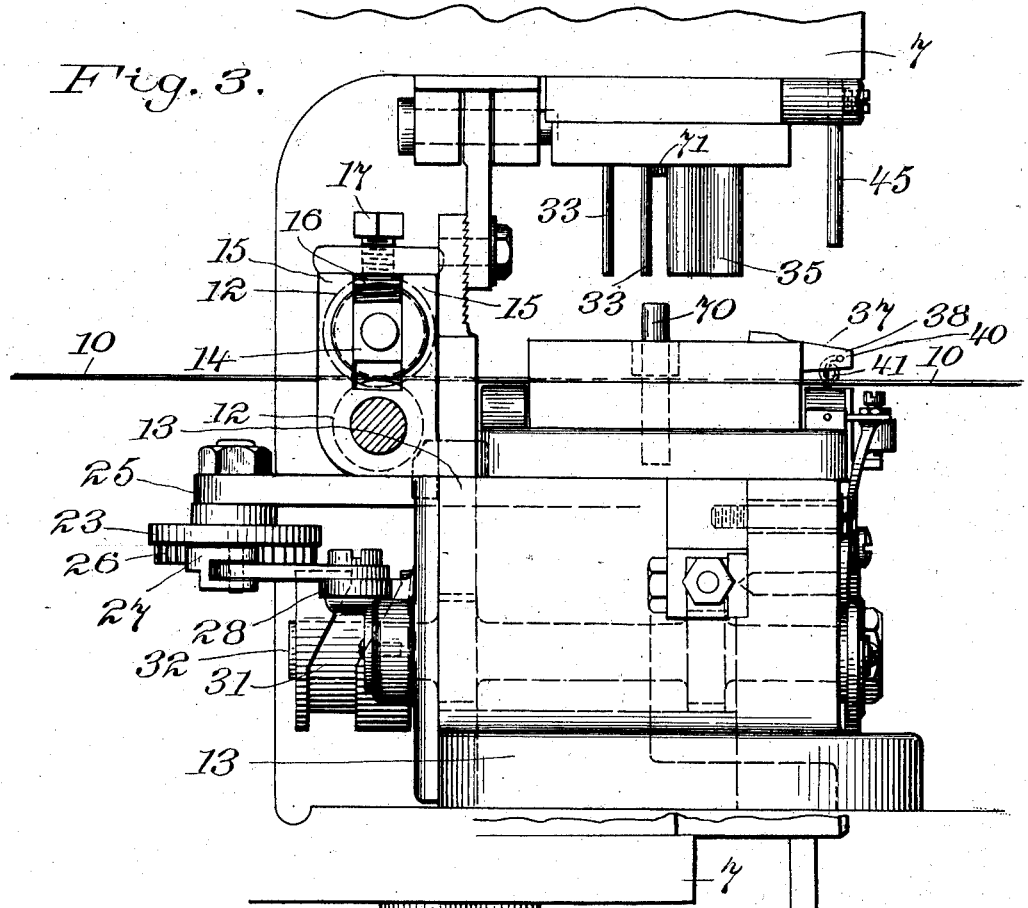
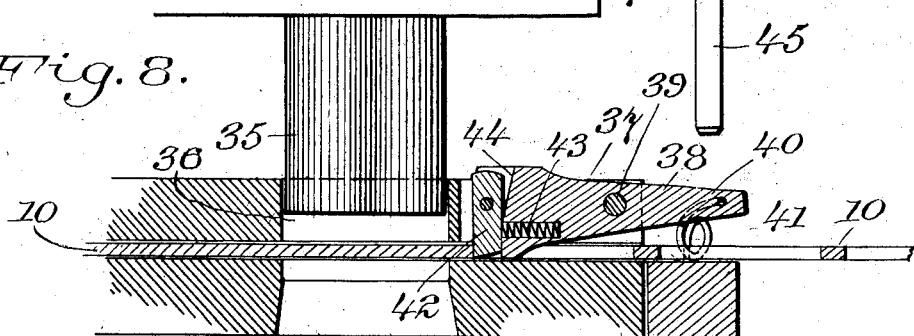
WITNESSES: INVENTOR
Louis T. Weiss
BY
ATTORNEY No. 738,266. PATENTED SEPT. 8, 1903.
L. T. WEISS.
HINGE MAKING MACHINE.
APPLICATION FILED AUG. 2, 1902.
NO MODEL. 7 SHEETS—SHEET 4.
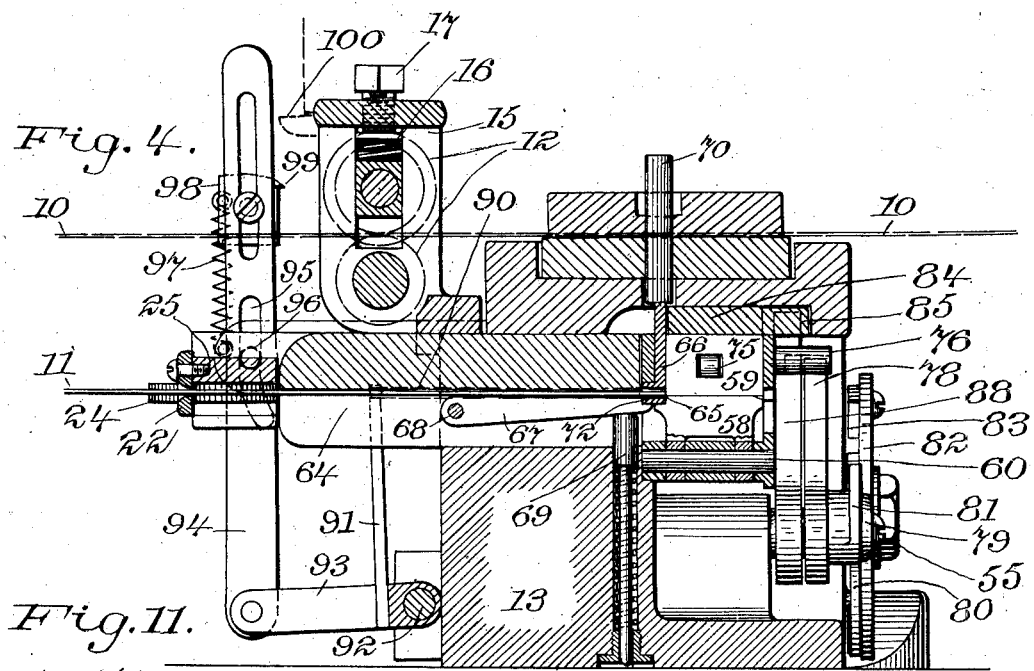
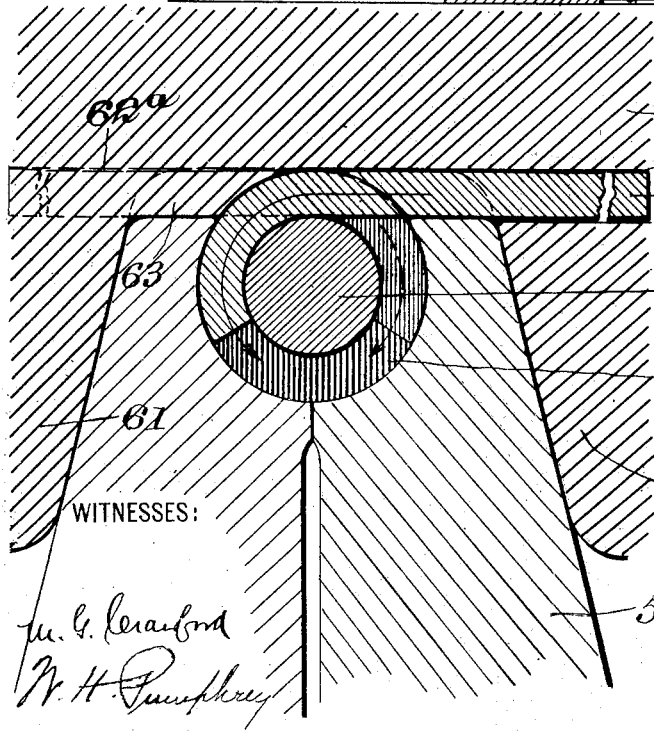
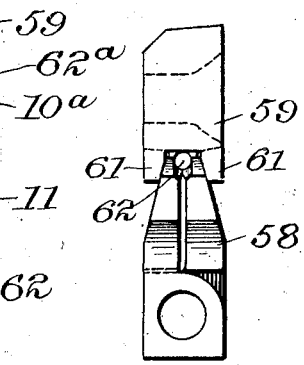

No. 738,266. PATENTED SEPT. 8, 1903.
L. T. WEISS.
HINGE MAKING MACHINE.
APPLICATION FILED AUG. 2, 1902.
NO MODEL. 7 SHEETS—SHEET 5.
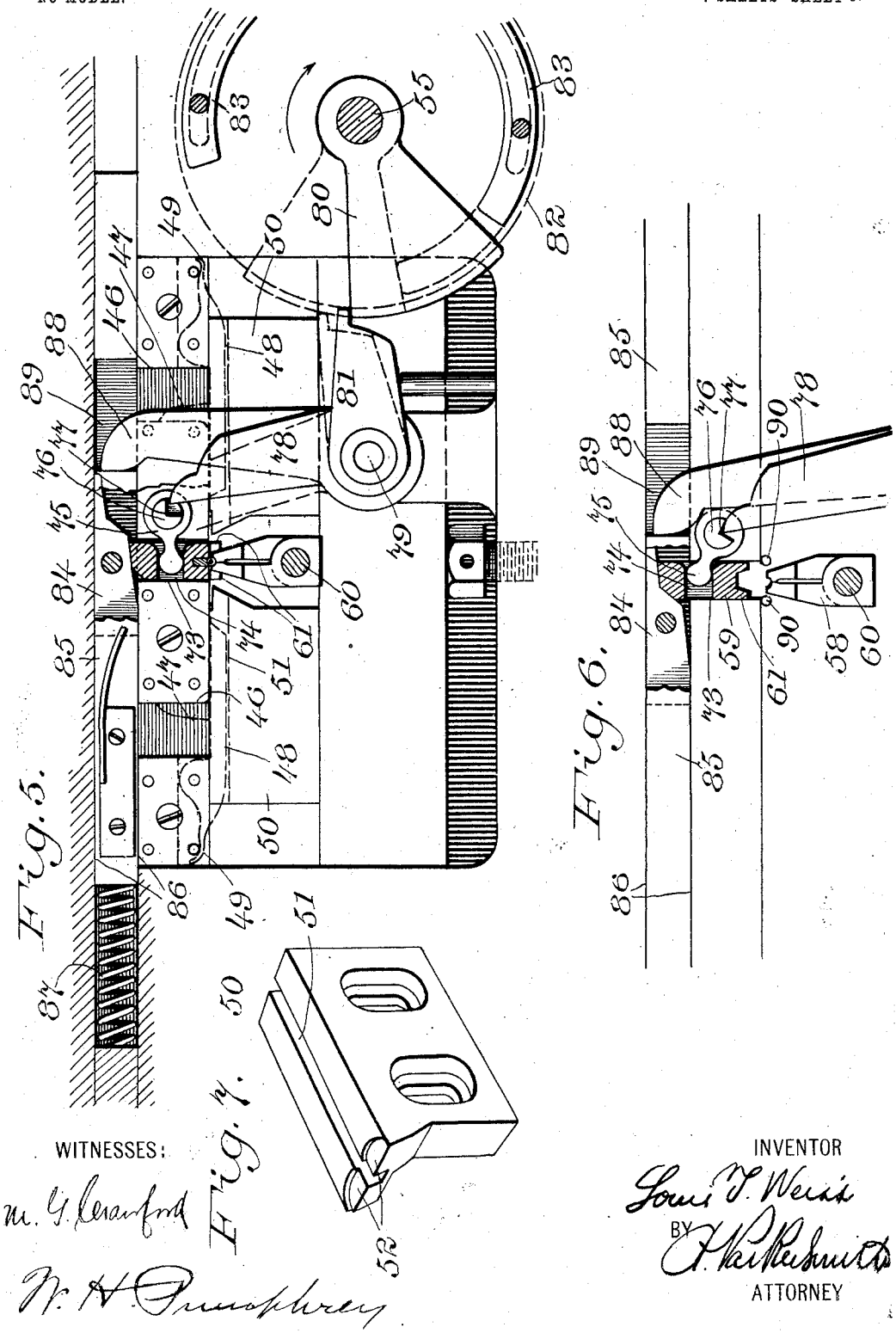

No. 738,266. PATENTED SEPT. 8, 1903.
L. T. WEISS.
HINGE MAKING MACHINE.
APPLICATION FILED AUG. 2, 1902.
NO MODEL. 7 SHEETS—SHEET 6.
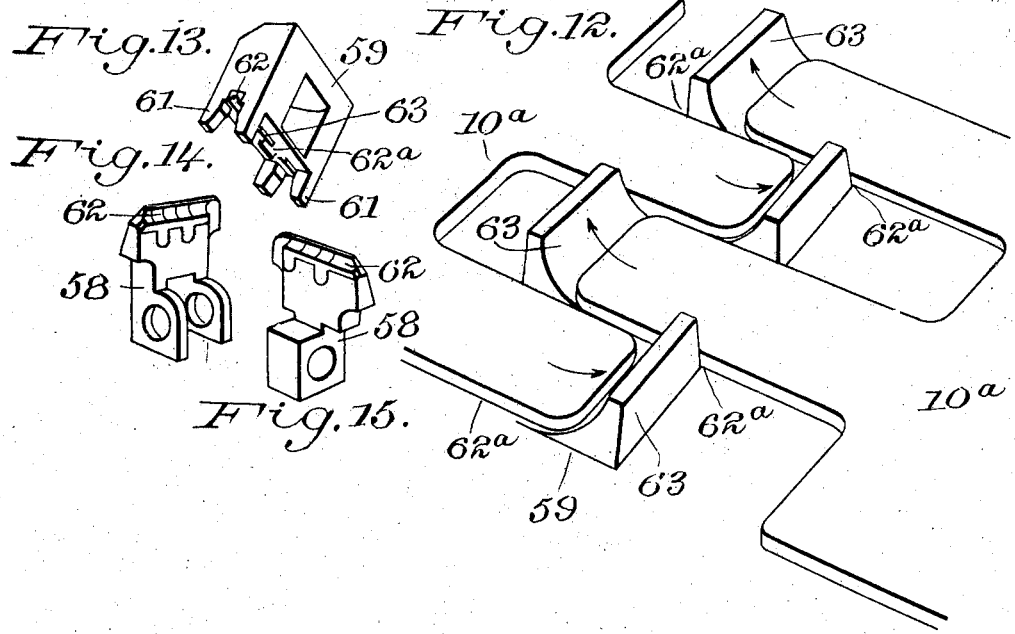
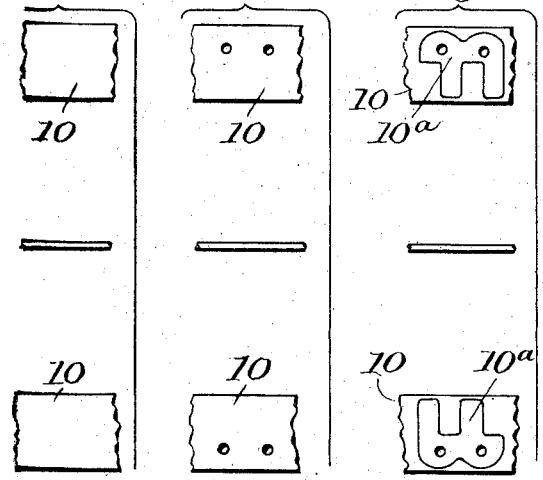
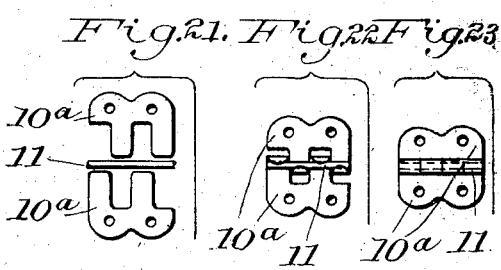
WITNESSES:
INVENTOR
Louis T. Weiss
BY
ATTORNEY No. 738,266. PATENTED SEPT. 8, 1903.
L. T. WEISS.
HINGE MAKING MACHINE.
APPLICATION FILED AUG. 2, 1902.
NO MODEL. 7 SHEETS—SHEET 7.
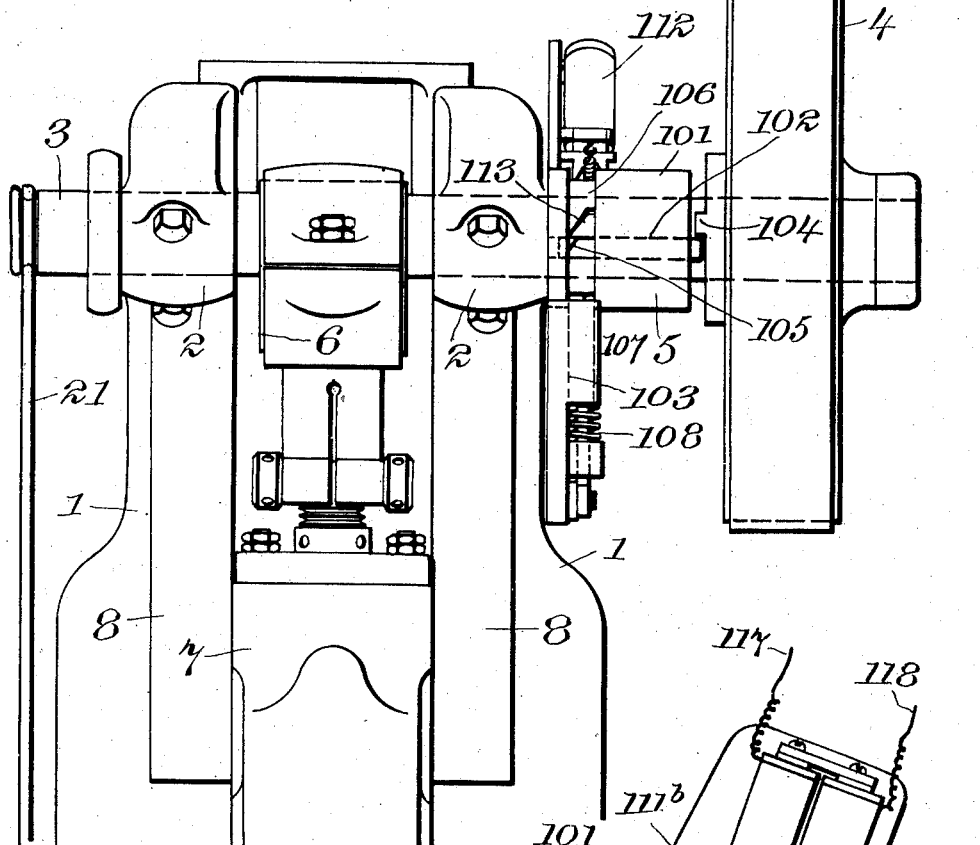
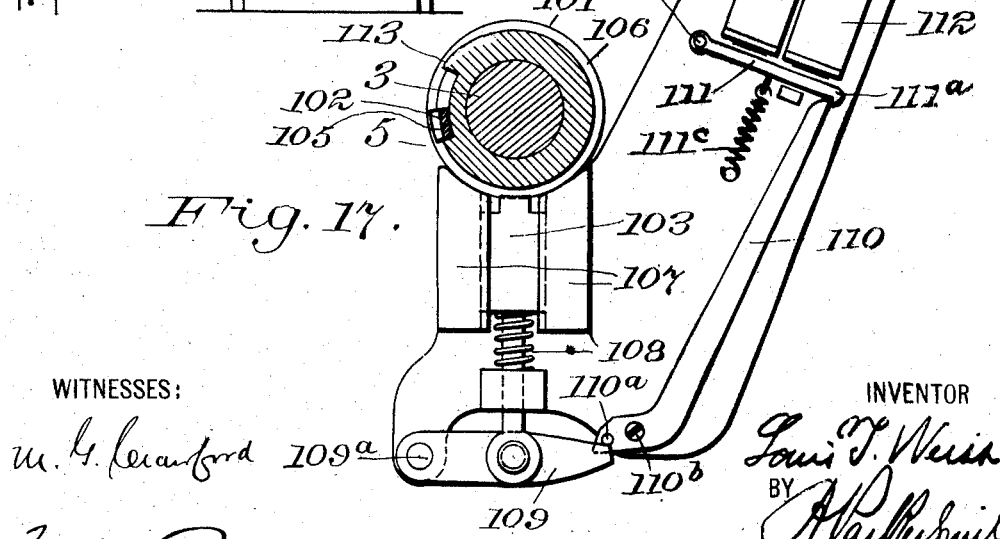
WITNESSES:
M. G. Crawford
W. H. Pumphrey
INVENTOR
Louis T. Weiss
BY
H. Vanderschmitt
ATTORNEY No. 738,266.

Patented September 8, 1903.

UNITED STATES PATENT OFFICE.

LOUIS T. WEISS, OF BROOKLYN, NEW YORK, ASSIGNOR TO WILLIAM M. SPEER, OF NEW YORK, N. Y.

HINGE-MAKING MACHINE.

SPECIFICATION forming part of Letters Patent No. 738,266, dated September 8, 1903.

Application filed August 2, 1902. Serial No. 118,137. (No model.)

*To all whom it may concern:*

Be it known that I, LOUIS T. WEISS, a citizen of the United States of America, and a resident of the borough of Brooklyn, county of Kings, city and State of New York, have invented certain new and useful Improvements in Hinge-Making Machines, of which the following is a specification.

My invention relates generally to machines for making butt-hinges, and is specifically designed to produce a machine of this class automatic throughout in performing the various steps necessary in the operation of constructing complete and finished hinges from sheet metal.

One of the main features of my invention consists in the employment of an automatic stop to coöperate with the feed mechanism in controlling the advance of the sheet-metal strips or ribbons to the punches, the same serving to time the delivery of the material in accordance with the action of the punches and also to regulate the length fed forward, thereby utilizing the material to its fullest extent and avoiding unnecessary waste.

A second important feature consists in the former for the knuckles of the hinge, in which the leaf-blanks and pintle are assembled and united in the form of a complete and finished hinge as a single step in the operation of the machine.

A third feature of importance consists in protecting the machine from being broken or choked up, as might occur in the event of failure of the hinge parts to become properly assembled and united in the former. For this purpose I employ, in connection with a main clutch controlling the power to the machine, an automatic throw-out, designed to act in such emergencies to disconnect the clutch and stop the machine.

Various other features of novelty, combinations, and arrangements of parts, &c., will be hereinafter more particularly described, and pointed out in the claims.

The preferred form of mechanism embodying my invention is illustrated in the accompanying seven sheets of drawings, throughout the several views of which like numerals of reference indicate corresponding parts.

Figure 2:
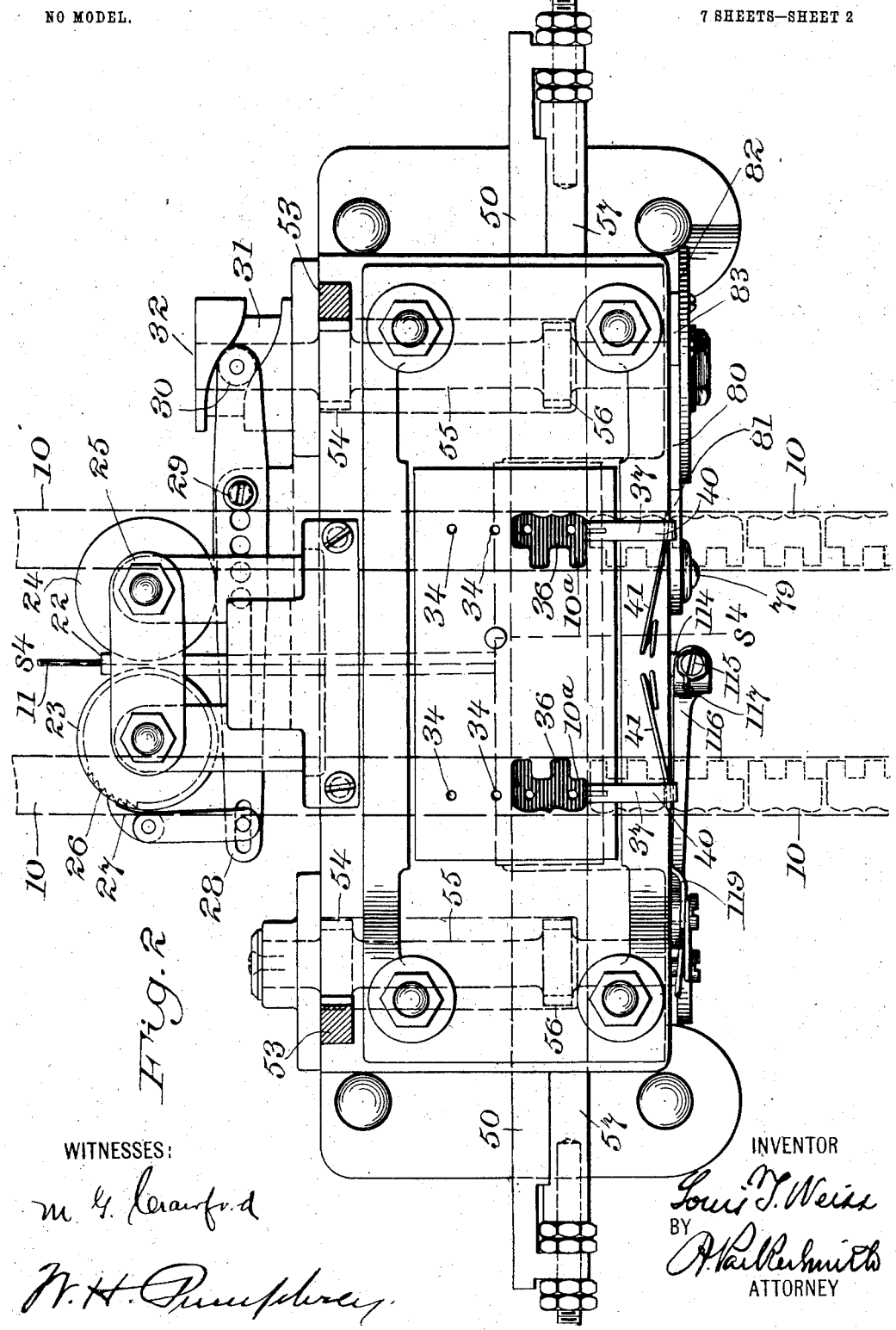

In the drawings, Figure 1 is a view in front elevation of a hinge-making machine constructed in accordance with my invention. Fig. 2 is a horizontal sectional view taken on line $s^2 s^2$ of Fig. 1, the friction feed-rolls for the metallic ribbons being omitted and the ribbons indicated by dotted lines to more clearly show the ratchet-feed, &c., for the hinge pintle-wire. Fig. 3 is a view in side elevation looking in the direction indicated by the arrow $s^3$ in Fig. 1, the belt-pulley, &c., for driving the ribbon feed-rolls being omitted to show the ratchet-feed, &c., for the hinge pintle-wire. Fig. 4 is a central vertical section taken on the line $s^4 s^4$ of Fig. 2. Fig. 5 is a detail view in front elevation with certain parts broken away and in section, illustrating the mechanism, &c., for assembling the leaves and pintle and uniting the same to form the hinge-knuckle, the members of the former being shown in locked relation. Fig. 6 is a similar view of a portion of the same, showing the members of the former separated and the ejector in position to deliver the finished hinge. Fig. 7 is a detail view in perspective of one of the reciprocating slides by which the leaf-blanks are taken from the magazines and delivered to the former. Fig. 8 is an enlarged sectional view of the automatic feed-stop, the same being shown in position engaging an opening of the metallic ribbon from which a blank has been punched to check its further advance by the feed-rolls until the punch has descended and stamped out another blank. Fig. 9 is a similar view showing the punch in its lowermost position after having punched out a blank from the ribbon and the stop disengaged, leaving the ribbon free to be advanced as the punch clears the same on the upstroke. Fig. 10 is a detail view of the members of the former, showing the same assembled in locked relation. Fig. 11 is an enlarged sectional detail view of the engaging portions of these members, illustrating the manner in which the blanks enter the former and are bent around the hinge-pintle wire. Fig. 12 is an enlarged detail perspective view of the face of the upper member of the former, showing the lugs by which the interlocking projections of the hinge-blanks are bent up, as indicated by arrows, and curved around the wire or pintle of the hinge. Fig. 13 is a perspective view of the upper member of the former; and Figs. 14 and 15 are similar views of the lower members thereof, all of which are shown separated to more clearly illustrate their construction. Fig. 16 is a view in elevation of the upper portion of a die-press to which the hinge-making machine is applied, showing the clutch for connecting the press to the power or driving wheel. Fig. 17 is a detail sectional view of the clutch and an electromagnetic trip for controlling the same. Figs. 18 to 23 illustrate the various steps in stamping out, assembling, and completing a hinge. Fig. 18 shows the relation of the blank ribbons and the pintle-wire as delivered by the feed-rolls. Fig. 19 shows the first step in the operation—that is, the action of the first set of punches on the ribbons to form the screw-holes of the hinge, the relation of the ribbons to the wire being the same as in Fig. 18. Fig. 20 shows the second step or the cutting of the leaf-blanks from the ribbons by the second set of punches. Fig. 21 shows the third step or the advance of the blanks from the magazines toward the wire or pintle and their relation when assembled. Fig. 22 shows the fourth step or the action of the former in bending up interlocking projections of the blanks about the pintle, and Fig. 23 shows the completed hinge.

Referring to the drawings, 1 represents the frame of an ordinary die-press, and 2 2 bearings in part with the frame. Mounted to turn freely in these bearings there is a shaft 3, to which continuous rotary motion is imparted by a belt-wheel 4, driven from any overhead counter-shaft. This wheel is loosely mounted on the shaft and is thrown in or out of gear therewith by means of a clutch 5, a detailed description of which will follow later on. About centrally of the bearings an eccentric 6 is secured fast to or formed in part with the shaft and in rotation serves to impart a reciprocating motion to a plunger 7, working in parallel guides 8 8 of the press-frame.

On the bed 9 of the press the mechanism for punching, assembling, and uniting the hinge-blanks, &c., is mounted. I will first describe the feed mechanism by which the sheet-metal strips or ribbons are fed into the machine.

In the rear of the press twin reels (not shown) are arranged to carry the sheet-metal strips or ribbons 10 10 from which the leaf-blanks 10ª 10ª are punched, and about centrally of these reels a spool of wire (not shown) is mounted, which serves when cut into suitable lengths as pintles 11 11, &c., for the hinges. It will of course be understood that supports or carriers of any suitable form may be substituted for the reels, &c., as the latter are employed merely for convenience in storing a large amount of stock and saving floor-space. From the reels, as best shown in Figs. 3 and 4, each ribbon passes between a pair of friction feed-rollers 12 12, mounted in an offset or extension of the main casting 13, which latter is bolted upon the bed of the press. The upper rollers of each pair are provided with flanges which overlap the lower rollers, and the ribbons in passing between the same are maintained properly alined and prevented from binding in the guide-openings leading to the punches. In order that the feed may yield to any inequalities in the stock and at the same time to obtain the requisite pressure between the rollers for advancing the ribbon as may be required, the upper roller of each pair is preferably mounted in a block 14, movable in guides 15 15, and by means of springs 16 these rollers are forced into close contact with the ribbons supported by the lower rollers, the pressure being regulated by set-screws 17, engaging the springs. As shown in Fig. 1, the shaft 18, carrying the lower rollers, extends outward and after passing through a bracketed bearing 19 projects beyond the same to receive a grooved pulley 20, which is connected with the eccentric or power shaft 3 of the press by an endless belt 21, as shown in Fig. 16. It will therefore be seen that by means of this direct connection through the belt from the main shaft the lower pair of feed-rolls will be continuously driven and through frictional contact will feed the ribbons forward from the reels to the punches, the upper flanged rollers acting merely as guides.

*Feed mechanism for the hinge-pintle wire.*—The wire is led forward from the spool and after passing through a flaring or funnel-shaped opening in a plate 22 is frictionally gripped by two milled rollers 23 24, which are mounted in a bearing 25, bracketed to the main casting. An intermittent feed is employed for advancing the wire into the machine or toward the former and consists of the ratchet-wheel 26, secured to the under face and rotating with the milled wheel 23 and the pawl 27, engaging the ratchet and reciprocated by an arm 28, pivoted at 29 and provided with a roller 30, working in a cam 31. This cam is mounted on an extension 32 of a rock-shaft, which is geared to the reciprocating head of the plunger 7 in a manner to be later on described. The pawl 27 may be shifted with relation to its carrying-arm 28, or the pivot of the arm may be likewise shifted to vary the stroke of the pawl and effect a corresponding variation in the feed of the wire.

*Die and punch mechanism.*—As illustrated in Fig. 19, the first step consists in punching two holes in each of the ribbons, which are designed to serve as the screw-holes of the hinge, and the next step in cutting or punching the blanks. Both operations are performed simultaneously, but in different portions of the ribbons on the downstroke of the plunger-head. To accomplish this, I provide the head with two sets of screw-hole punches 33 33, which coöperate with openings 34 34 (see Fig. 2) in the die-plate and in line with these punches; but separated therefrom a suitable distance a pair of leaf-blank punches 35 35 are arranged to coöperate with openings 36 36 in the die-plate. As the head descends the various punches act simultaneously, the first set described to punch out the screw-holes and the second set to cut the blanks which were apertured in the previous operation.

*Automatic feed-stop mechanism.*—It is desirable that the blanks should be punched out with as little waste as possible, and by controlling the feed the ribbons may be reduced to the merest skeletons. To accomplish this, I employ in connection with each ribbon an automatic stop 37, which times its delivery and regulates the length fed forward. When these stops act, the advance of the ribbons is positively checked, and at such times the friction of the feed-rolls is either overcome or the driving-belt slips until the stop is disengaged, permitting the ribbons to be again advanced in the manner described. Referring to Figs. 8 and 9, the stop is shown as consisting of an arm 38, pivoted at 39 in the die-plate and having its outer projecting end 40 engaged by an upward-acting spring 41. This arm is provided at its engaging end with a yielding face consisting of a pivoted spring-pressed dog 42—that is to say, its inner end is notched to receive a dog 42, which is adapted to successively engage the openings in the ribbon from which the leaf-blanks have been cut. The lower or engaging end of the dog is pressed outward by a spring 43; but its movement in this direction is limited by its upper end abutting against a shoulder 44 of the arm 38. As shown in Fig. 8, the spring 41 acts to throw the inner end of the arm 38 downward into the recess of the ribbon and hold the dog 42 in engagement with the inner wall of such recess, thereby positively locking the ribbon against further advance by the feed until the punch 35 has descended and cut out a blank. In order to disengage the ribbon when this operation has been completed, a depending stud 45 is secured to the plunger-head 7, there being one of such studs arranged to coöperate with the outer end of each of the stop-arms, so that as the head descends the studs engage and trip these stop-arms by depressing their outer ends and causing their inner ends to swing upward, thereby disengaging the dog, as illustrated in Fig. 9, to release the ribbon. In order to prevent an immediate reengagement of the stop with the recess in the ribbon as the punch is withdrawn by the upward movement of the head, the spring 43 acts as soon as the dog clears the wall of the recess in the ribbon to swing the same about its pivot or into the position shown in Fig. 9, thereby preventing its return into the same recess and allowing the ribbon to be fed forward preparatory to the next operation of the punch.

*Magazines for the leaf-blanks.*—As the blanks are punched they are stored in twin magazines 46 46. These magazines, walled in on three sides only and open at the top and bottom, are provided interiorly with retaining-guides 47 to prevent the blanks from becoming jammed therein and hold them properly registered one above the other. There are also provided pivoted arms 48 48, (best shown in Fig. 5,) one of which extends beneath each magazine and is yieldingly forced upward by a spring 49 into contact with the blanks as a yielding support therefor. These magazines might be as readily constructed with their outline in cross-section corresponding to the form of leaf-blank; but I prefer the approximately rectangular form with retaining guides or tongues entering between the projections of the blanks, as above described. It will be observed that by increasing the depth of the magazines any desired number of blanks may be stored therein; also, that such blanks cut by another machine could be readily placed therein and the feed, punch, and die mechanism disconnected for the time. While such suggested modifications are obviously possible and practical, I prefer the arrangement of mechanism herein shown and described, in which the machine is compact, self-contained, and occupies an exceptionally small floor-space.

*Mechanism for assembling two leaves.*—Twin slides 50 50 are arranged to reciprocate in guides beneath the magazines and are designed to take the lowermost pair of blanks from the magazines and carry them forward to the former. These slides (best shown in Figs. 5 and 7) are grooved longitudinally, as at 51, to straddle the pivoted arms 48 and are recessed at their engaging ends 52 to the approximate form of the leaf-blanks. They are geared to travel outward in opposite directions and come to rest beneath the magazines as the punches cut the blanks from the ribbons, and as new blanks are added at the top of each pile the slides take a pair of blanks from the bottom and carry them to the former. The wall of each magazine adjacent to the former is slightly cut away and rounded at the bottom to provide clearance necessary for the advance of the lower pair of blanks by the reciprocating slides or pushers. The spring-arms 48 48, while serving to yieldingly sustain the blanks in the magazine, also coöperate with the pushers by being extended outward to support each pair of blanks in their travel toward the former. The reciprocating slides are mounted in suitable ways formed in the main casting to have a free back-and-forth movement under the action of suitable gearing connecting them with the plunger-head, so that on the downstroke of the head the slides separate and move outward in opposite directions or into a position to take the lowermost pair of blanks from the magazine. As the head moves upward the motion of the slides is reversed, and they travel inward to deliver the blanks to the former. The gearing for operating the slides comprises two rack-bars 53 53, depending from the plunger-head and meshing with toothed pinions 54 54 on rock-shafts 55 55, mounted in suitable bearings in the main casting. These shafts are each provided with an additional pinion 56, which are engaged by rack-bars 57 57, carried by the reciprocating slides. The depending rack-bars 53 53 are formed in two parts adjustably connected, and the rack-bars of the slides are adjustably secured thereon, so that the relation of these parts may be varied to time the movement of the slides and the delivery of the blanks according to the descent of the head.

*Knuckle-forming mechanism.*—The leaf-blanks and pintle-wire are assembled and united in a two-part former (best shown in Figs. 10 to 15) which comprises two blocks 58 and 59, arranged one above the other. The lower block is centrally divided along a vertical plane, with a hinge connecting the two parts at the bottom—that is to say, these parts are mounted upon a pin or stud 60, projecting from the main casting, and have a limited movement in opening and closing for a purpose to be later on described. The sections of the lower block have their opposite faces beveled, as shown in Figs. 10 and 11, and the upper block is provided with correspondingly-beveled lugs or projections 61 61, &c., which when the blocks are operatively combined straddle the beveled end of the lower block and lock the sections thereof together. When thus combined, a central cylindrical chamber 62 is formed between the members, having a series of passages 62ᵃ 62ᵃ, &c., alternately arranged to lead into the same from opposite sides and tangential to the walls thereof, such passages being all located in a common plane parallel with the bore of the chamber, but in separate planes which are perpendicular to the bore. The outline of the cross-section of that portion of the chamber in the lower block forms about two-thirds of the circumference of a circle which is completed by a series of arc-shaped projections 63 63, &c., depending from the face of the upper block. These arc-shaped projections correspond in number with the tangential passages and lie opposite the same within the cylindrical chamber, as shown in Figs. 11 and 12, to serve in giving the initial bend or upturn to the interlocking projections of the leaf-blanks. These blanks are delivered by the reciprocating slides so that their interlocking projections enter the tangential passages, and on being forced inward by the continued movement of the slides these projections first encounter the arc-shaped lugs, and are thereby bent up, as indicated by the arrows in Fig. 12. Assuming the hinge-pintle wire to be in position as shown in Fig. 11, the only path of travel open to the projections of the blank is around the pintle or in the annular space between the same and the wall of the cylindrical chamber in the former. Consequently on further movement of the slides these blanks are forced together, and the projections continue in the direction indicated by the arrows in Fig. 11 around the pintle, completely encircling the same and completing the hinge.

*Locking and adjusting mechanism for the former.*—Before the blanks enter the former it is necessary that the members thereof should be locked, as shown in Fig. 5, and when the hinge is completed the members of the former must be free to separate in order to release the completed hinge and permit it to be ejected therefrom. To effect this action, the upper block of the former is mounted to move up and down in a recess or guide 73 and is provided with an opening 74, in which the rounded end of a crank-arm 75 projects. This crank-arm is carried by the shaft 76, turning in suitable bearings, and has its outer end notched at 77 or otherwise formed to coöperate with a trip-arm 78, mounted on a shaft 79. This trip is operated from one of the rock-shafts 55 by means of a segment 80, loose on the shaft, coöperating with an arm 81 on the shaft 79. When the former-blocks are locked together, the segment drops below the arm 81 and the engaging end of the latter rests upon the same, as shown in Fig. 5. The segment is operatively connected with the rock-shaft by means of a disk 82, having adjustably secured thereon two blocks 83 83, adapted when the disk is oscillated by the rock-shaft to engage and shift the segment. As the rock-shaft is rotated toward the right or in the direction indicated by the arrow in Fig. 5 one of the blocks 83 engages and carries the segment around with it, and the segment in swinging the arm 81 upward, as indicated by dotted lines, causes the trip to throw the crank-arm 75 and elevate the upper block of the former to the position shown in Fig. 6 or until it clears the lower block sufficiently to permit the sections thereof to separate slightly and free the completed hinge, which is delivered by an ejector, to be later on described. To lock the members of the former together, a wedge 84 is employed, which is carried by a sliding bar 85, movable in suitable ways 86 and acted upon by a spring 87, tending to force the wedge into locked position. The wedge has a double-beveled face which coöperates with correspondingly-beveled faces of the upper block of the former. In the unlocked position, or when this block is elevated, the beveled faces having the sharpest incline are in engagement, as shown. When the spring is free to act, the upper block is cammed down rapidly, owing to the sharp bevel of the engaging faces, until it straddles the upper tapered end of the lower block. Then the second beveled face or the wedge proper, having only a slight incline, engaging the correspondingly-beveled face of the upper block is forced over the same to the full strength of the spring, securely locking the blocks in the position shown in Fig. 5 preparatory to the hinge-blanks being entered by the reciprocating slides. The release of the wedge is effected by an arm 88, mounted on shaft 79 and working in a recess or slot 89 of the slide 85. It will be noticed that the relative position of the arms 78 and 88 is such that when their carrying-shaft is rocked in the manner described the arm 88 being in contact with the wall of the recess in the slide acts first and forces the slide toward the left as viewed in Fig. 5 in order to disengage the wedge and shift the same clear of the upper block before the second trip-arm 78 throws the crank by which the block is elevated. As the blocks of the former are separated in the manner described to free the completed hinge they are held thus adjusted to provide an interval of time required for the advance and withdrawal of the ejector in delivering the completed hinge. This is effected by the segment 80 and arm 81 coöperating in the manner of toggle-levers by becoming locked when shifted to the position shown by dotted lines in Fig. 5, such locking action resulting from the parts being relatively proportioned to engage at a point above their centers, in which position they are self-sustained against the action of the spring 87. Their disengagement is brought about on the upstroke of the plunger-head by the rotation of the rock-shaft and disk being reversed to cause the block 83 to engage the segment and force the same around to the position shown in full lines in Fig. 5 or until it clears the arm 81, and thereupon the spring 87, being free to act, again advances the wedge by which the former-blocks are adjusted and locked together preparatory to receiving a pair of leaf-blanks from the reciprocating slides in the manner above described.

*Wire guide and cutting mechanism.*—Referring now to Fig. 4, it will be seen that the wire after passing through the milled feed-rollers enters the slotted way or guide 64 in the main casting and continues onward through an opening 65 in the shearing-plate 66 located directly in the rear of the former. This plate rests in the notched end of an arm 67, pivoted at 68 in the wire-guide slot, the arm being in turn supported by a spring-pin 69. Above the cutter or shearing plate 66 and in contact with the same a pin 70 is mounted to have a free up-and-down movement. The pin 70 is designed to be engaged and depressed by the depending stud 71, carried by the adjustable plunger-head 7 (see Fig. 1) and when thus depressed forces the plate 66 downward, and the latter, coöperating with the rear faces of the former members, cuts or shears the wire flush with the end of the hinge. In order to prevent short bends in the wire and also the disengagement of the end of the wire from the guide-opening in the shearing-plate, the pivoted arm 67 is made of suitable length and is provided with a groove along its upper surface to receive the wire, so that in the shearing action the wire is bent very slightly and only at or near the pivotal point of the arm. As the guide-slot is extremely narrow or of a width slightly in excess of the diameter of the wire, it will be seen that on the return of the arm 67 to a horizontal position by the action of the spring-pin the wire will be again straightened out. It is also important that the end of the wire should not be withdrawn from the guide-opening in the shearing-plate, which serves to hold it alined with the cylindrical chamber in the former, and to prevent such disengagement as the shearing-plate is depressed the length of the guide-opening therein is increased by a tubular extension 72, formed in part therewith. Referring to Figs. 1 and 2, it will be seen that on the downstroke of the plunger-head the racks depending therefrom in engagement with the pinions of the rock-shafts 55 55 will rotate the cam 31 toward the right and swing the pawl-carrying arm 28 to adjust the pawl preparatory to advancing the wire. As the head reaches the limit of its movement the pins 70 71 are brought into engagement, and the wire is sheared in the manner described as the last step in the operation necessary to complete the hinge. On the upward movement of the head the rotation of the cam is reversed, and the pawl-carrying arm being swung back causes the pawl to rotate the ratchet-wheel, and thereby imparts the requisite rotation to the friction feed-wheels to advance the end of the wire from the shearing-plate into the cylindrical chamber of the former, as shown in Fig. 11.

*Ejector mechanism.*—As above described, the former opens when the hinge is completed to free the same, and its delivery is effected by an ejector. (Best shown in Figs. 4 and 6.) Any suitable device might be employed for this purpose; but I prefer the form shown, which comprises two pins or fingers 90 90, movable freely back and forth in guide-openings in the main casting under the action of a crank-arm 91. This arm is fast on a rock-shaft 92, mounted in suitable bearings on the rear face of the main casting, and is oscillated to advance or throw the ejector forward on each upstroke of the head. A second crank-arm 93, fast on the rock-shaft, extends horizontally outward and is pivotally secured at its free end to a trip-arm 94. This arm is slotted about centrally of its length, as indicated at 95, to receive a guide pin or stud 96 of a bracketed extension from the main casting. The upper portion of the slot in the trip-arm extends parallel with its length; but the lower portion thereof is curved, and as a result the trip is slightly oscillated when elevated—that is to say, its upper end is thrown toward the left as viewed in Fig. 4. A spring 97, secured at one end to the trip-arm and at the other to the bracket, serves to yieldingly retain the arm in its lowermost position and the ejector-fingers retracted. On the upper end of the trip-arm there is adjustably secured a block 98, having a toe 99, projecting normally in the path of travel of a trip 100, carried by the plunger-head. This trip is pivotally mounted and spring-controlled to yield in one direction only—that is to say, each of these parts—i. e., the trip and toe—is provided with a beveled face and a flat face, and on the downstroke of the plunger-head their beveled faces engage and the trip yields sufficiently to force by the toe, but is immediately thereafter centered or returned to normal position by its spring. On the upstroke the trip again strikes the toe, and as their opposite or flat faces now engage there is no tendency to yield. Consequently the trip-arm is elevated by the trip and continues upward against the action of its spring until its upper end is cammed over toward the left, Fig. 4, by the pin 96 entering the lower curved portion of the slot 95. This serves to draw the toe out of engagement with the trip, and the various parts are then returned to their normal position by the spring 97. The elevation of the trip-arm in the manner described lifts the outer end of the crank 93, and thereby rotates the rock-shaft 92 and advances the fingers between the former-blocks, as shown in Fig. 6, to eject the hinge. The fingers are withdrawn by the action of the spring 97 in returning the trip-arm to its normal position. The ejector acts with sufficient force and rapidity to throw the completed hinges outward clear of the machine into a suitable receptacle. (Not shown.)

*Clutch and automatic throw-out therefor.*—As this machine is automatic throughout and may be successfully run by a boy or an unskilled workman, it is desirable to render the same self-protecting and not depend upon the operator in the event of failure of the mechanism to coöperate properly. The members of the former being the most delicate and expensive parts of the machine and as failure of the mechanism to feed, cut, or deliver the material would not likely be observed until the former had choked up or a defective blank had become jammed therein I arrange the automatic throw-out for the clutch to be controlled by the movable wedge which adjusts the upper block of the former and secures the same in locked relation with the lower block thereof. By this arrangement of mechanism to be described the throw-out operates to disengage the clutch and stop the machine whenever the wedge fails in making its full movement to adjust and lock the movable block of the former, and as a result there is little or no danger of injury to the members of this device. Any suitable clutch—such, for example, as that shown in Figs. 16 and 17—may be employed in connecting the main or eccentric shaft of the machine with the driving or belt wheel 4. This clutch comprises a sleeve 101, fast on the eccentric-shaft 3, and two coöperating spring-advanced slides 102 and 103. The slide 102 is movable in a longitudinal groove formed in the bore of the sleeve, and its outer end is adapted when the clutch is thrown in to project in the path of travel of a lug 104 on the hub of the belt-wheel 4 and provide a driving connection between the wheel and shaft. This slide is cammed clear of the lug 104 by the end of the second slide 103 engaging a beveled portion 105 thereof, the same being exposed in an annular groove 106 of the clutch-sleeve. The last-mentioned slide 103 is movable in guides 107, under the influence of a spring 108, tending to force its engaging end into the annular groove, but is held clear thereof, with its spring compressed by a latch comprising three coöperating levers 109, 110, and 111. The lever 109, pivoted at 109$^a$, is operatively secured by a pin-and-slot connection with the lower end of slide 103, and the free end of the lever is engaged by a stud or projection 110$^a$ of the second lever 110, the same being pivoted at 110$^b$ and provided with a long arm extending upward under the hooked end 111$^a$ of the third lever 111. The last-mentioned lever, pivoted at 111$^b$, is held in engagement with lever 110 by a spring 111$^c$ and serves as the armature of an electromagnet 112. This magnet works on an open circuit and is deenergized normally—i. e., when the clutch is thrown in to connect the machine with the power. When the circuit is closed, in a manner to be described, the magnet attracts its armature, which in responding carries the hook 111$^a$ clear of the engaging end of the lever 110, and the spring 108, being then free to act, forces the slide 103 into the annular groove 106 and throws out the clutch. In order to bring the machine to a dead stop, a shoulder 113 is formed in the annular groove of the clutch-sleeve, against which the engaging end of the slide 103 abuts after camming the clutch-slide 102 clear of the driving-wheel.

The circuit-closing device (best shown in Figs. 1, 2, and 3) consists of a spring-arm 114, forming one terminal, and a contact-point 115, forming the other terminal of a circuit, including the electromagnet 112. The arm 114 is grounded on the machine by being secured directly to the wedge-slide 85, and thus mounted moves with the same. The point 115, suitably protected by insulation, is carried by an arm 116, pivotally secured on the front face of the main casting, and from the contact-point an insulated wire 117 leads to the electromagnet 112, the other wire 118 from the magnet being suitably grounded on the machine to complete the ground-circuit back to the terminal 114. A spring 119, engaging the arm 116, tends to close the circuit by forcing the point 115 downward into contact with the arm 114; but movement of the arm in this direction is checked by a cam 120 on the outer projecting end of the rock-shaft 55. The cam engages the lower end of the arm 116 and holds the same against the action of the spring, with its outer end elevated and the circuit-terminals separated.

The movement of the wedge-slide toward the left to the position shown in Fig. 6 serves to bring the lower terminal 114 of the circuit-closer, directly beneath but not in contact with the upper terminal thereof, as in Fig. 1. If the machine has been operating properly and there is nothing to prevent or interfere with the return of the upper former-block into locked relation with the lower block, this lower terminal will be shifted by the wedge-slide toward the right and clear of the upper terminal before the latter is depressed by its spring-actuated carrying-arm 116 dropping from the high to the low part of the cam, and consequently there is no contact, the circuit remains open and the machine continues in operation. If, however, a hinge or one or more blanks have become jammed in the former or if, in fact, there is sufficient interference to prevent the return of the upper former-block, the wedge-slide cannot make its full movement toward the right, and as a result the lower terminal will remain beneath the upper terminal, and the latter on being depressed will close the circuit, energize the magnet, and release the latch in the manner described to throw out the clutch and stop the machine. After the former has been cleared by the removal of imperfect blanks or the like the wedge-slide, upper block, &c., will be forced into operative position by the spring 87, and the machine may be started up by setting the latch to throw in the clutch.

As the operation of the machine will be apparent from the foregoing description, I will describe the same very briefly. The sheet-metal strips or ribbons and the hinge pintle-wire in being drawn from the reels may, if desired, be made to pass through suitable straighteners before being fed into the machine. Under the action of the feed-rolls the ribbons are advanced through the guides toward the dies until checked by the automatic stops, and as the plunger descends a pair of hinge leaf-blanks are punched out and deposited in the magazines. Simultaneously with this operation the second set of punches carried by the head cut the screw-holes for the next pair of blanks to be punched out. As a pair of blanks are forced into the magazines from the top the reciprocating slides or pushers take the lowermost pair and on the upstroke of the plunger carry these blanks to the former, the members of which are locked together. The necessary length of wire for the pintle of the hinge having been previously entered in the former by the action of the ratchet-feed, the interlocking projections of the blanks pass into the cylindrical chamber thereof by way of the tangential openings, and under the continuous pressure of the slides are forced closely around the pintle until they completely encircle and grip the same. The hinge being now formed the pintle-wire is sheared flush with the end thereof as the plunger-head again descends and the ejector acts on the following upstroke to deliver the completed article.

Some of the main advantages of my invention are as follows: The employment of an automatic stop or spacer in connection with a continuous-feed mechanism results in utilizing the material to its fullest extent and prevents unnecessary waste thereof. Assembling and uniting the blanks to form the hinge-knuckles complete as a single step in the operation serves to greatly simplify the mechanism and also to largely increase the output of the machine. The provision of an automatic throw-out by which the machine is rendered self-protecting insures absolutely against serious injury to the mechanism, &c. The machine being entirely automatic in action the employment of skilled labor is rendered unnecessary and the cost of operating the same is reduced to a minimum. In producing a completed hinge from rough stock in a single machine frequent handling of the material is avoided, the floor-space and shop-room occupied is comparatively small, and there is a further saving in power and labor.

It will be understood that I do not wish to limit myself to the exact construction and arrangement of parts herein shown and described, as various changes might be made without departing from the spirit and scope of my invention. For example, other feed mechanism might be substituted for that shown and the automatic stop dispensed with. The machine might be reduced to assembling, forming, and uniting the hinge parts by dispensing with the punch and die mechanism and providing magazines to receive large quantities of suitably-formed leaf-blanks. Other forms of gearing might be substituted for the rack-bars, pinions, and rock-shafts shown. The relation between the magazines and former might be changed and other means employed to deliver the blanks from one to the other. The adjusting, locking, and lock-operating mechanism for the upper former-block might be replaced by equivalent mechanism differing in form and arrangement, &c.; but all such modifications I consider obvious and immaterial variations of form and not of substance and still within the meaning of the present invention.

Having therefore described my invention, what I claim as new, and desire to protect by Letters Patent, is—

1. In a machine adapted to punch blanks from a metallic ribbon, the combination of continuously-moving frictional feed mechanism for said ribbon, a reciprocating punch adapted to stamp out portions of the body of said ribbon, an automatic stop located in the path of the ribbon beyond the punch, and means whereby each downward stroke of the punch disengages the stop from the ribbon and leaves it free to reëngage as the ribbon is advanced by the frictional feed mechanism after the withdrawal of the punch.

2. In a machine adapted to punch blanks from a metallic ribbon, the combination of continuously-moving frictional feed mechanism for said ribbon, a reciprocating punch adapted to stamp out portions of the body of said ribbon, but leaving a continuous skeleton thereof, an automatic stop located in the path of the ribbon beyond the punch, and adapted to consecutively engage the openings left by said punch, and means whereby each downward stroke of the punch disengages the stop from the particular ribbon-opening with which it is engaged, and leaves it free to fall into the next succeeding opening as the ribbon is advanced by the frictional feed mechanism after each withdrawal of the punch.

3. In a machine adapted to punch blanks from a metallic ribbon, the combination of continuously-moving frictional feed mechanism for said ribbon, a reciprocating punch adapted to stamp out portions of the body of said ribbon, but leaving a continuous skeleton thereof, an automatic stop located in the path of the ribbon beyond the punch, and adapted to consecutively engage the openings left by said punch, said automatic stop consisting of a pivoted lever having a yielding portion adapted to engage one edge of the opening in the ribbon, and a projection from the punch adapted to strike the rear portion of said lever and lift the yielding portion from engagement with the ribbon skeleton.

4. In a machine adapted to punch blanks from a metallic ribbon, the combination of continuously-moving frictional feed mechanism for said ribbon, a reciprocating punch adapted to stamp out portions of the body of said ribbon, an automatic stop located in the path of the ribbon beyond the punch, trip mechanism operating on each downward stroke of the punch to disengage the stop from the ribbon, and means for preventing the stop from reëngaging until the ribbon is advanced by the frictional feed mechanism after the withdrawal of the punch.

5. In a machine of the class described, the combination with mechanism for cutting blanks from metallic ribbons, of feed mechanism for said ribbons, reciprocating punches of the blank-cutting mechanism being adapted to stamp out from said ribbons blanks having interlocking projections, magazines for the reception of said blanks located below the punches, and means for assembling the bottom blanks from each of the magazines and bending their interlocking projections.

6. In a machine of the class described, the combination with mechanism for cutting blanks from metallic ribbons, of feed mechanism for said ribbons, reciprocating punches of the blank-cutting mechanism being adapted to stamp out from said ribbons blanks having interlocking projections, magazines for the reception of said blanks located below the punches, and means for assembling the bottom blanks from each of the magazines and bending their interlocking projections, said last-mentioned means comprising reciprocating slides forming the bottom of said magazines and a former located between said slides and provided with recesses into which the projecting portions of the blanks are forced by the reciprocating slides.

7. In a machine of the class described, the combination with mechanism for cutting blanks from metallic ribbons, of feed mechanism for said ribbons, reciprocating punches of the blank-cutting mechanism being adapted to stamp out from said ribbons blanks having interlocking projections, magazines for the reception of said blanks located below the punches, and means for assembling the bottom blanks from each of the magazines and bending their interlocking projections, said last-mentioned means comprising pivoted levers yieldingly sustained beneath the magazines, and reciprocating slides grooved to straddle the levers and together forming the bottom of said magazines.

8. The combination of two oppositely-arranged magazines adapted to hold one or more blanks provided with projections adapted to interlock one with another, means for feeding a pintle-wire between said magazines, and means for assembling the blanks in pairs and bending their interlocking projections about the pintle-wire.

9. The combination of two oppositely-arranged magazines adapted to hold one or more blanks provided with projections adapted to interlock one with another, means for feeding a pintle-wire between said magazines, and means for assembling the blanks in pairs and bending their interlocking projections about the pintle-wire, together with means for severing the portion of wire so inclosed from the remainder thereof.

10. The combination of two oppositely-arranged magazines adapted to hold one or more blanks provided with projections adapted to interlock one with another, means for feeding a pintle-wire between said magazines, and means for assembling the blanks in pairs and bending their interlocking projections about the pintle-wire, said last-mentioned means comprising a former having a cylindrical chamber, in which the wire is centered, with side openings in the shape of passage-ways tangential to the cylindrical portion and adapted to receive the interlocking projections of the blanks.

11. In a hinge-making machine, a two-part former comprising a lower block having a groove in its upper end, the outline of the cross-section of which forms about two-thirds the circumference of a circle, combined with an upper block provided with arc-shaped projections so located that when the two blocks are assembled a cylindrical chamber is formed having a series of passage-ways leading into said chamber from either side tangentially to the walls thereof.

12. In a hinge-making machine, a two-part former comprising a lower block having a groove in its upper end, the outline of the cross-section of which forms about two-thirds the circumference of a circle, combined with an upper block provided with arc-shaped projections so located that when the two blocks are assembled a cylindrical chamber is formed having a series of passage-ways leading into said chamber from either side tangentially to the walls thereof, said lower block being centrally divided along a vertical plane, with a hinge connecting the two sections at the bottom, and said upper block being provided with overhanging projections locking said sections of the lower block together when the upper and lower blocks are assembled.

13. In a hinge-making machine, a two-part former comprising a lower block having a groove in its upper end, the outline of the cross-section of which forms about two-thirds the circumference of a circle, combined with an upper block provided with arc-shaped projections so located that when the two blocks are assembled a cylindrical chamber is formed having a series of passage-ways leading into said chamber from either side tangentially to the walls thereof, together with means for separating the blocks to permit of the discharge of the completed hinge.

14. In a hinge-making machine, a two-part former comprising a lower block having a groove in its upper end, the outline of the cross-section of which forms about two-thirds the circumference of a circle, combined with an upper block provided with arc-shaped projections so located that when the two blocks are assembled a cylindrical chamber is formed having a series of passage-ways leading into said chamber from either side tangentially to the walls thereof, said lower block being centrally divided along a vertical plane, with a hinge connecting the two sections at the bottom, and said upper block being provided with overhanging projections locking said sections of the lower block together when the upper and lower blocks are assembled, together with means for lifting the upper block to free the completed hinge.

15. In a hinge-making machine, a two-part former comprising a lower block having a groove in its upper end, the outline of the cross-section of which forms about two-thirds the circumference of a circle, combined with an upper block provided with arc-shaped projections so located that when the two blocks are assembled a cylindrical chamber is formed having a series of passage-ways leading into said chamber from either side tangentially to the walls thereof, said lower block being centrally divided along a vertical plane, with a hinge connecting the two sections at the bottom, and said upper block being provided with overhanging projections locking said sections of the lower block together when the upper and lower blocks are assembled, together with means for lifting the upper block to free the completed hinge, and removable means adapted to lock the upper block down in its position of engagement or to be removed to permit the upper block to be lifted.

16. In a metal-bending machine of the character described, the combination of the two-part former, means for separating the parts to free the completed article, a reciprocating wedge adapted to lock said parts together, reciprocating mechanism for moving said wedge into and out of locking position, and a yielding connection between said wedge and its reciprocating mechanism.

17. In a metal-bending machine of the character described, the combination of the two-part former, means for separating the parts to free the completed article, a reciprocating wedge adapted to lock said parts together, reciprocating mechanism for moving said wedge into and out of locking position, and a yielding connection between said wedge and its reciprocating mechanism, together with an ejector, a clutch through which the power to run the machine as a whole is transmitted, an electromagnet adapted to throw said clutch out of operation when its coils are energized, a normally open electric circuit connected to said coils, and a contact making and breaking apparatus for said circuit, the position of one terminal of which is controlled by the wedge.

18. In a metal-bending machine of the character described, the combination of the two-part former, means for separating the parts to free the completed article, a reciprocating wedge adapted to lock said parts together, reciprocating mechanism for moving said wedge into and out of locking position, and a yielding connection between said wedge and its reciprocating mechanism, together with means for disconnecting the power from the machine, and apparatus for throwing said means into operation whenever the wedge is prevented from returning to the locking position.

19. A former for metal-bending machines having a cylindrical chamber with tangential passage-ways leading thereto from both sides, said passage-ways being all located in a common plane parallel to the axis of the cylindrical chamber, but in separate planes which are perpendicular to said axis.

20. A former for metal-bending machines having a cylindrical chamber with tangential passage-ways leading thereto from both sides, said passage-ways being all located in a common plane parallel to the axis of the cylindrical chamber, but in separate planes which are perpendicular to said axis, in combination with means for feeding wire axially into said chamber, and means for forcing the projecting portions of suitable metal blanks into the chamber through the tangential passage-ways and around the wire.

21. In a machine of the character described, the combination of the reciprocating plunger and the punches carried thereby, the die-plate with which the punches coöperate, magazines for the blanks, a two-part former arranged between the magazines, an intermittent ratchet feed mechanism for delivering wire to the former, oppositely-reciprocating slides for feeding the blanks from the magazines to the former, gearing for reciprocating the slides comprising parallel rock-shafts carrying pinions operatively connected with the plunger-head and the feed-slides by intermeshing rack-bars, and a cam on one of the rock-shafts for operating the wire-feed mechanism.

22. In a metal-bending machine of the character described, the combination of feeding mechanism for the blanks, a two-part former separable to free the completed article, means for locking said parts together, a clutch controlling the power to said feed mechanism and locking means and an automatic throw-out for the clutch, comprising suitable clutch-disengaging mechanism, a spring-actuated latch for holding the same adjusted, an electromagnetic trip for the latch and a circuit-closer, which, upon failure of the former to become properly assembled, is operated by the aforesaid locking means to complete a circuit and thereby energize the electromagnetic trip.

23. In a hinge-making machine, a two-part former, comprising a lower block having a groove in its upper end, the outline of the cross-section of which forms about two-thirds the circumference of a circle, combined with an upper block provided with arc-shaped projections so located that when the two blocks are assembled a cylindrical chamber is formed having a series of passage-ways leading into said chamber from either side tangentially to the walls thereof, together with means for separating the blocks to permit of the discharge of the completed hinge, said means comprising a lifting-arm engaging the upper block of the former, a suitably-driven rock-shaft provided with two engaging projections, a segment loosely mounted upon the rock-shaft with its free end extending between said engaging projections into operative relation with the lifting-arm.

Signed at New York, N. Y., this 1st day of August, 1902.

LOUIS T. WEISS.

Witnesses:
W. H. PUMPHREY,
A. PARKER SMITH.